Figure 1:
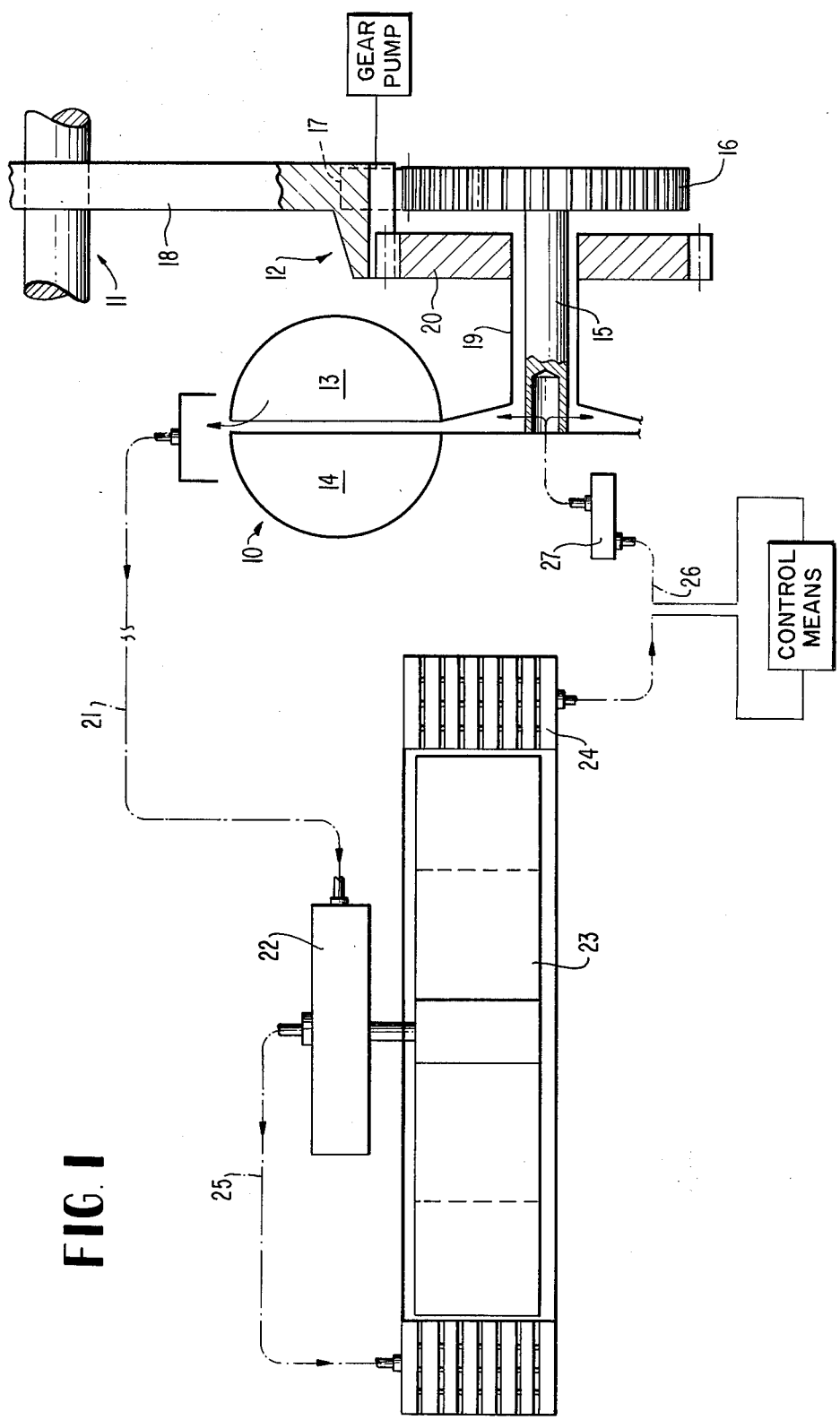

United States Patent [19]

Bultmann

[11] 4,114,734
[45] Sep. 19, 1978

[54] RETARDER FOR VEHICLES, ESPECIALLY HEAVY TRUCKS

[75] Inventor: Friedrich Bultmann, Winnenden, Fed. Rep. of Germany

[73] Assignee: Daimler-Benz Aktiengesellschaft, Fed. Rep. of Germany

[21] Appl. No.: 326,564

[22] Filed: Jan. 24, 1973

[30] Foreign Application Priority Data

Jan. 25, 1972 [DE] Fed. Rep. of Germany ....... 2203319

[51] Int. Cl.² .............................................. F16D 57/04
[52] U.S. Cl. ...................... 188/274; 60/330; 60/337; 60/339; 188/264 E; 188/264 F; 188/296
[58] Field of Search ................... 188/290, 296, 264 E, 188/264 F, 274; 60/DIG. 3, DIG. 5, 330, 337, 339; 192/4 B, 12 A

[56] References Cited

U.S. PATENT DOCUMENTS

| 2,355,484 | 8/1944 | Teker | 188/264 E X |
|---|---|---|---|
| 2,723,530 | 11/1955 | O'Leary | 60/337 X |
| 2,787,170 | 4/1957 | Forster | 192/4 B |
| 2,827,133 | 3/1958 | Schneider | 192/12 A |
| 2,946,416 | 7/1960 | Snoy | 192/12 A |
| 3,185,261 | 5/1965 | Campbell et al. | 188/296 |
| 3,642,062 | 2/1972 | Edmaier et al. | 165/125 |
| 3,675,510 | 7/1972 | Duggar | 74/801 |

FOREIGN PATENT DOCUMENTS

| 1,802,105 | 9/1970 | Fed. Rep. of Germany | 188/296 |
|---|---|---|---|
| 1,808,029 | 5/1970 | Fed. Rep. of Germany | 188/290 |
| 466,436 | 5/1937 | United Kingdom | 188/296 |

Primary Examiner—George E. A. Halvosa
Attorney, Agent, or Firm—Craig & Antonelli

[57] ABSTRACT

A continuous brake (retarder) for vehicles, especially for heavy trucks or the like, which utilizes a hydrodynamic circulatory system in the form of a driven hydrodynamic coupling whose operating fluid is conducted into an external circulatory system by way of a cooler or radiator; a separate cooler is coordinated to the hydrodynamic coupling which serves at the same time as feed pump for the operating fluid; additionally, the hydrodynamic coupling is operatively connected with a turbine in the external circulatory system which serves for the drive of a separate fan coordinated to the separate cooler.

14 Claims, 2 Drawing Figures

RETARDER FOR VEHICLES, ESPECIALLY HEAVY TRUCKS

The present invention relates to a continuous brake (retarder) for vehicles, especially for motor vehicles and predominantly for heavy trucks with a hydrodynamic circulation of the type of a hydrodynamic coupling driven by the vehicle, whose operating fluid is conducted into an external circulatory system by way of a cooler or radiator.

With continuous brakes of the aforementioned type, quite a considerable quantity of heat is produced in the hydrodynamic circulatory system. However, the vehicle radiator is not always sufficiently large in order to be able to carry off this additional heat quantity in addition to the engine heat, particularly as this radiator cannot be enlarged at will for cost reasons and, under certain circumstances, also for space reasons. Furthermore, with some vehicles, such as, for example, trailers, no radiators at all are present.

The present invention is concerned with the task to provide a continuous brake (retarder) also for such vehicles. The continuous brake should thereby be so constructed as much as possible that it can also be installed subsequently.

The underlying problems are solved with the aforementioned arrangements in that a separate cooler or radiator is coordinated to the hydrodynamic coupling and this hydrodynamic coupling serves at the same time as feed pump for the operating fluid and is operatively connected with a turbine for the drive of a separate fan coordinated to the separate cooler.

A more or less self-sufficient retarder system results in an advantageous manner from the present invention which can be utilized in all of the aforementioned cases. This is particularly appropriate if, according to a further inventive feature, the two wheels or rotors of the hydrodynamic coupling are adapted to be driven in opposite directions of rotation and that the absolute rotational speeds of these two rotors are at least approximately equal. More particularly, the pump effect, i.e., therefore the feed quantity of the hydrodynamic coupling can be considerably increased in this manner.

It is unimportant in principle in what manner the retarder is driven; however, it is only necessary that it be operatively connected in each case with the vehicle axle or axles. Thus, for example, the drive from the transmission output shaft could be used. Also, the coordination to the joint shaft or to the differential gear is feasible within the scope of the present invention, as also the drive from the transmission input shaft. With trailers, the arrangement on one axle is also possible.

A further proposal of the present invention resides in that the two rotors of the hydrodynamic coupling are connected with intermediate gears of approximately identical diameter, of which one gear engages directly with a gear wheel of double width connected with the driving shaft while the other gear engages with this gear wheel of the driving shaft by way of a reversing gear. Such an intermediate gear drive, for example, in the form of a counter shaft gear makes it possible to render the rotational speeds practically identical in a simple manner and to build in simultaneously a considerable step-up gearing, in case it is desired. Additionally, a further simplification is thus available if, according to still another feature of the present invention, the reversing gear, in its turn, serves for the purpose of driving a pump, preferably a gear pump for lubricating purposes or the like. Moreover, it is appropriate if the driving gear wheel is arranged on the driving shaft itself.

The present invention can be further developed in that the hydrodynamic coupling serving as retarder is combined together with its drive and possibly together with its control elements into a structural unit within a common housing. A structural unit, closed in itself, i.e., a self-contained unit results in this manner which can also be installed subsequently. It should be mentioned at this occasion that the control of the hydrodynamic coupling can take place in any conventional known manner. Since such controls are known in the art and form no part of the present invention, a detailed description thereof is dispensed with herein.

It is proposed in detail for the layout of the structural unit that the gear wheel operatively connected with the drive shaft is extended with its hub as far as possible into the plane of the hydrodynamic coupling and its wheel body is constructed conically and carries at its outer circumference a ring gear in the form of radial serrations. It is additionally proposed by the present invention that one rotor of the hydrodynamic coupling is connected by way of a central shaft with the corresponding intermediate gear wheel and this shaft is supported at both ends within the housing whereas the other rotor of the hydrodynamic coupling is operatively connected with the other intermediate gear by way of a hollow shaft concentric thereto and this hollow shaft is supported in its center within the housing. Finally, the driving gear wheel is non-rotatably arranged according to the present invention on a drive bush or sleeve rotatably supported in the housing so as to rotate in unison therewith, which drive bushing is provided at one end — disposed approximately in the plane of the hydrodynamic coupling — with internal spline teeth for the emplacement over the drive shaft and at the other end thereof with a flange for the connection with a transmitting shaft.

Altogether, an approximately disk-shaped structural unit results in this manner whose individual parts are so nested one within the other that it becomes as narrow as possible. The housing therefor may consist essentially of three basic parts. Two of the basic parts thereof enclose the gear drive and the third encloses the hydrodynamic coupling. The former two housing parts are thereby so drawn-in that the hydrodynamic coupling still has space inside the disk contour of the overall structural unit, i.e., it is arranged — so to speak of — in a recess of the center of the two basic parts of the housing and the third housing part then covers the same against the outside.

The present invention can be further constructed in such a manner that the outlet or discharge of the hydrodynamic coupling is in communication by way of a line with the inlet of a radial turbine, whose discharge is connected with the cooler or radiator inlet, and that a line leads back from the cooler outlet to the inlet of the hydrodynamic coupling possibly under interconnection of a turn-off or by-pass valve and/or of other control devices. It is proposed thereby in that case that the fan is constructed as conventional radial fan and the cooler or radiator as annular cooler which is arranged about the fan.

Accordingly, it is an object of the present invention to provide a continuous brake for vehicles, especially for motor vehicles, which avoids by simple means the aforementioned shortcomings and drawbacks encountered in the prior art.

Another object of the present invention resides in a retarder for motor vehicles, especially for heavy trucks, which is able to carry off the relatively large quantity of heat produced in the retarder and which is capable of proper operation under all conditions.

A further object of the present invention resides in a continuous brake (retarder) for motor vehicles which can be installed also subsequently and can be used with all types of vehicles, including trailers which normally have no radiator.

A still further object of the present invention resides in a retarder for vehicles which is simple in construction and obviates the need for a separate supply pump.

Still a further object of the present invention resides in a continuous brake for all types of vehicles which constitutes a self-sufficient system capable of installation as a compact structural unit.

Figure 2:
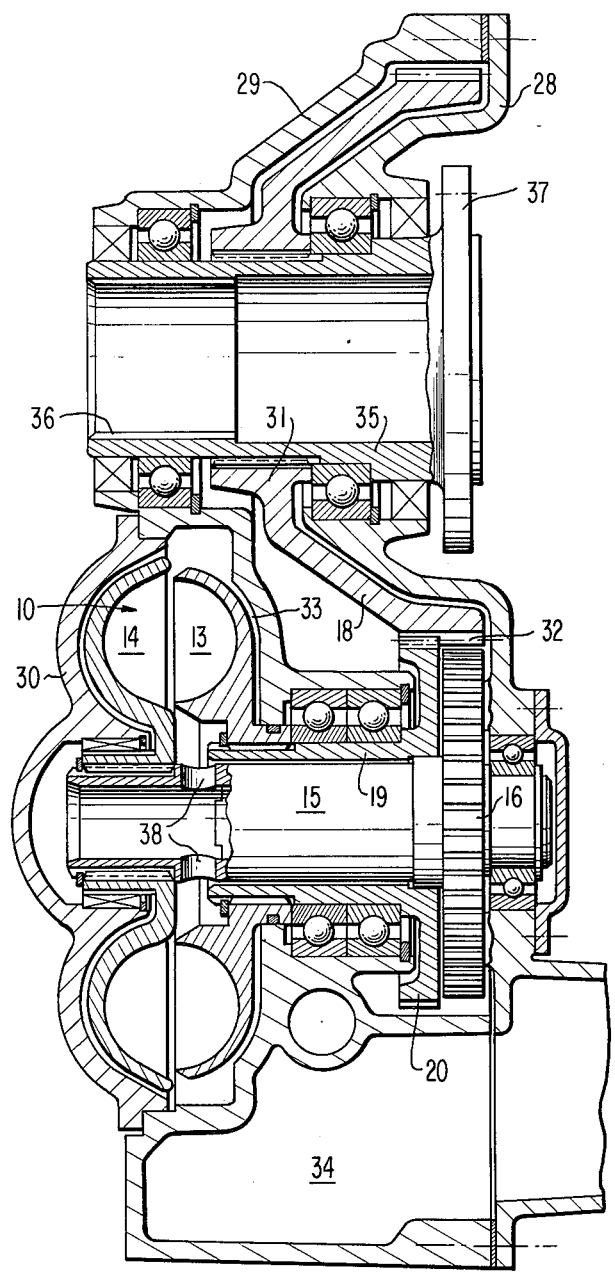

These and further objects, features, and advantages of the present invention will become more apparent from the following description when taken in connection with the accompanying drawing which shows, for purposes of illustration only, one embodiment in accordance with the present invention, and wherein:

FIG. 1 is a schematic view of the overall construction of a retarder system in accordance with the present invention; and FIG. 2 is a longitudinal cross-sectional view through the structural unit of such a retarder system.

Referring now to the drawing wherein like reference numerals are used throughout the two views to designate like parts, and more particularly to FIG. 1, the retarder generally designated by reference numeral 10 in this figure is constructed in the manner of a hydrodynamic coupling. It is driven from the drive shaft 11 — which may be the transmission output shaft or any other shaft of the vehicle connected with the vehicle axles — by way of an intermediate gear generally designated by reference numeral 12 which may be a countershaft gear. The hydrodynamic coupling 10 includes a rotor 13 and a rotor 14 which rotate in mutually opposite directions. The rotor 14 is operatively connected by way of a shaft 15 with a gear 16 which engages by way of a reversing gear 17 with the gear wheel 18 fixedly arranged on the drive shaft 11. The rotor 13 of the hydrodynamic coupling 10 is connected by way of a hollow shaft 19 with a second gear 20 which engages in the same gear rim of the gear 18 which thus has a double width, so to speak of. Both rotors 13 and 14 have therefore nearly the same absolute rotational speed and differ solely by the respective direction of rotation.

As a result of this opposite direction of rotation of the two rotors 13 and 14, the hydrodynamic coupling 10 operates to an increased extent as feed pump which feeds its operating fluid by way of the line 21 to a radial turbine 22. The latter drives a radial fan or blower 23 which is concentrically surrounded by an annular cooler or radiator 24. The discharge or outlet of the turbine 22 is operatively connected by way of a line 25 with the inlet of the cooler 24. The cooler discharge, in its turn, is connected again with the inlet of the hydrodynamic coupling 10 by means of a line 26 and by way of a turn-off or by-pass valve 27 of any conventional construction. Line 26 may further include control elements as illustrated in FIG. 1.

For purposes of braking, the hydrodynamic coupling 10 is filled and it pumps the operating fluid through the external circulatory system described hereinabove. The turbine 22 is driven by the operating fluid and the radial fan 23 recools the operating fluid again in the cooler or radiator 24. Since the pressure drop and the velocity of the operating fluid flow depends on the brake output of the retarder, an additional control for the drive of the fan 23 is not necessary. The parts so far described are further completed by other parts of the retarder control which are of conventional construction, forming no part of the present invention and therefore are not described in detail herein. They form altogether a continuous braking system independent of the vehicle radiator.

According to FIG. 2, the entire retarder unit, i.e., the hydrodynamic coupling 10 and the gear drive 16, 18, 20 as well as further parts of the control system of conventional construction and of no interest in this application are combined into a structural unit within a common housing. The housing essentially consists of the three basic parts 28, 29 and 30. In order that the entire housing receives an external contour which is as disk-shaped as possible, the individual parts are nested one within the other, so to speak of. To that end, the gear 18 is moved, for example, with its hub 31 as near as possible to the plane of the hydrodynamic coupling 10. The gear body of the gear 18 extends conically and carries at the outer circumference the internal ring gear teeth 32. The housing parts 28 and 29 are adapted to this configuration of the gear wheel 18 so that a ring-shaped indentation 33 results within the part 29 in which is arranged the hydrodynamic coupling 10. The latter is then closed off against the outside by the housing part 30 as a cover, so to speak of. The housing parts 28 and 29 form at the bottom an oil sump 34.

The gear wheel 18 is non-rotatably secured with its hub 31 on a drive bush or sleeve 35 so as to rotate in unison therewith. The drive sleeve 35 is supported in the housing parts 28 and 29 by appropriate bearings. It carries at its one end which is disposed essentially in the plane of the hydrodynamic coupling 10, internally a splined tooth arrangement 36 into which engages the driving shaft, for example, the transmission output shaft. At the opposite end, the driving sleeve 35 carries externally a flange 37 to which is connected the further transmitting shaft of the vehicle drive, for example, a joint shaft (not shown).

The rotor 14 of the hydrodynamic coupling 10 is connected with the gear wheel 16 by way of a central shaft 15. The shaft 15 is supported at its two ends within the housing, i.e., within the housing parts 28 and 30. It is hollow at one end so that the operating fluid can enter into the hydrodynamic coupling 10 through its radial bores 38.

The rotor 13 is operatively connected with the gear wheel 20 by way of a hollow shaft 19. This hollow shaft 19 is supported approximately in its center within the housing part 29 by means of appropriate bearings. This support is constructed relatively wide in order to impart the necessary stability to the hollow shaft 19. In the illustrated embodiment, two mutually adjacent ball bearings are used for that purpose.

The reversing gear (not shown) is arranged between the gear 16 and the ring 32 of the gear wheel 18. A gear pump may be driven from the reversing gear which pump may be utilized for the lubricating supply. The diameter difference of the gears 16 and 20 is so slight that the two rotors 13 and 14 of the hydrodynamic coupling have practically the same absolute rotational speed only in different directions of rotation.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A continuous brake system for vehicles comprising, in combination, a hydrodynamic coupling means for providing braking forces to a vehicle, said hydrodynamic coupling means operating to provide said braking forces exclusively by action of a fluid coupling, an annular cooler means for providing a large cooling surface area, a radial fan means for providing cooling air to said annular cooler means, said annular cooler means being arranged circumferentially about said radial fan means, such that said annular cooler means and said radial fan means are provided in a relatively flat structure, radial turbine means for driving said radial fan means, and circulatory means for circulating operating fluid from said hydrodynamic coupling means to said radial turbine means through said annular cooler means and back to said hydrodynamic coupling means, wherein said hydrodynamic coupling means pumps said operating fluid through said circulatory means, thereby cooling said operating fluid in a separate system characterized in that the hydrodynamic coupling means includes two rotors driven in opposite directions of rotation, wherein the two rotors of the hydrodynamic coupling means are driven at speeds whose absolute rotational speeds are at least approximately identical, and wherein the two rotors of the hydrodynamic coupling means are operatively connected with intermediate gear means of approximately identical diameter, of which one intermediate gear means engages directly with a gear wheel connected with a driving shaft while the other intermediate gear means engages with the gear wheel connected with the driving shaft by way of a reversing gear, characterized in that said gear wheel is of double width, and in that the reversing gear serves in its turn, for the drive of a pump for lubricating purposes or the like, characterized in that the hydrodynamic coupling means serving as a retarder together with its drive is combined into a structural unit within a common housing means, and characterized in that the gear wheel operatively connected with the driving shaft is extended with its hub as far as possible into the plane of the hydrodynamic coupling means and its wheel body is constructed conically and carries at its outer circumference toothed means of a ring gear.

2. A continuous brake according to claim 1, characterized in that one rotor of the hydrodynamic coupling means is connected with the corresponding intermediate gear means by way of a central shaft and in that said central shaft is supported within the housing means at both ends thereof whereas the other rotor is operatively connected with the other intermediate gear means by way of a hollow shaft disposed concentrically with respect to said first-mentioned central shaft, and in that said hollow shaft is supported approximately in the center thereof within the housing means.

3. A continuous brake according to claim 2, characterized in that the driving gear wheel is arranged nonrotatably on a driving sleeve means rotatably supported in the housing means, said driving sleeve means being provided at one end, disposed approximately in the plane of the hydrodynamic coupling means, with internal spline teeth for emplacement over the driving shaft and at the other end thereof with a flange for the connection with a further shaft.

4. A continuous brake according to claim 3, characterized in that said circulatory means includes an outlet of said hydrodynamic coupling means in operative connection with an inlet of the radial turbine means by way of a line, said radial turbine means being provided with an outlet operatively connected with an inlet of said annular cooler means, and in that a line leads back from an outlet of said annular cooler means to an inlet of the hydrodynamic coupling means.

5. A continuous brake according to claim 4, characterized in that said last-mentioned line includes a by-pass valve.

6. A continuous brake according to claim 5, characterized in that said last-mentioned line further includes control elements.

7. A continuous brake system for vehicles comprising, in combination, a hydrodynamic coupling means for providing braking forces to a vehicle, said hydrodynamic coupling means operating to provide said braking forces exclusively by action of a fluid coupling, an annular cooler means for providing a large cooling surface area, a radial fan means for providing cooling air to said annular cooler means, said annular cooler means being arranged circumferentially about said radial fan means, such that said annular cooler means and said radial fan means are provided in a relatively flat structure, radial turbine means for driving said radial fan means, and circulatory means for circulating operating fluid from said hydrodynamic coupling means to said radial turbine means through said annular cooler means and back to said hydrodynamic coupling means, wherein said hydrodynamic coupling means pumps said operating fluid through said circulatory means, thereby cooling said operating fluid in a separate system, characterized in that a gear wheel operatively connected with a driving shaft is extended with its hub as far as possible into the plane of the hydrodynamic coupling means, said gear wheel being constructed conically and carrying at its outer circumference toothed means of a ring gear.

8. A continuous brake according to claim 7, characterized in that the hydrodynamic coupling means serving as a retarder, together with its drive including said gear wheel, is combined into a structural unit within a common housing means.

9. A continuous brake according to claim 4, characterized in that a first rotor of the hydrodynamic coupling means is connected with a corresponding intermediate gear means by way of a central shaft and in that said central shaft is supported within the housing means at both ends thereof whereas a second rotor is operatively connected with another intermediate gear means by way of a hollow shaft disposed concentrically with respect to said first-mentioned central shaft, and in that said hollow shaft is supported approximately in the center thereof within the housing means.

10. A continuous brake according to claim 9, characterized in that said gear wheel is constructed to drive said intermediate gear means corresponding to said first rotor and said another intermediate gear means operatively connected with said second rotor by way of said ring gear.

11. A continuous brake according to claim 10, characterized in that said intermediate gear means connected with said first rotor and said intermediate gear means connected with said second rotor are of approximately identical diameter such that said two rotors are driven at speeds whose absolute rotational speeds are at least approximately identical.

12. A continuous brake according to claim 11, characterized in that said two rotors are driven in opposite directions of rotation by way of a reversing gear connected between said ring gear and one of said intermediate gears.

13. A continuous brake according to claim 8, characterized in that said gear wheel is arranged non-rotatably on a driving sleeve means rotatably supported in said housing means, said driving sleeve means being provided at one end, disposed approximately in the plane of the hydrodynamic coupling means with internal spline teeth for emplacement over the driving shaft, and at the other end thereof with a flange for connection with a further shaft.

14. A continuous brake system for vehicles comprising, in combination, a hydrodynamic coupling means for providing braking forces to a vehicle, said hydrodynamic coupling means operating to provide said braking forces exclusively by action of a fluid coupling, an annular cooler means for providing a large cooling surface area, a radial fan means for providing cooling air to said annular cooler means, said annular cooler means being arranged circumferentially about said radial fan means, such that said annular cooler means and said radial fan means are provided in a relatively flat structure, a radial turbine means for driving said radial fan means, and circulatory means for circulating operating fluid from said hydrodynamic coupling means to said radial turbine means through said annular cooler means and back to said hydrodynamic coupling means, wherein said hydrodynamic coupling means pumps said operating fluid through said circulatory means, thereby cooling said operating fluid in a separate system, characterized in that the hydrodynamic coupling means serving as a retarder together with its drive is combined into a structural unit within a common housing means, and characterized in that a driving gear wheel is arranged non-rotatably on a driving sleeve means rotatably supported in the housing means, said driving sleeve means being provided at one end, disposed approximately in the plane of the hydrodynamic coupling means, with internal spline teeth for emplacement over the driving shaft and at the other end thereof with a flange for the connection with a further shaft.

* * * * *